Figure 1:
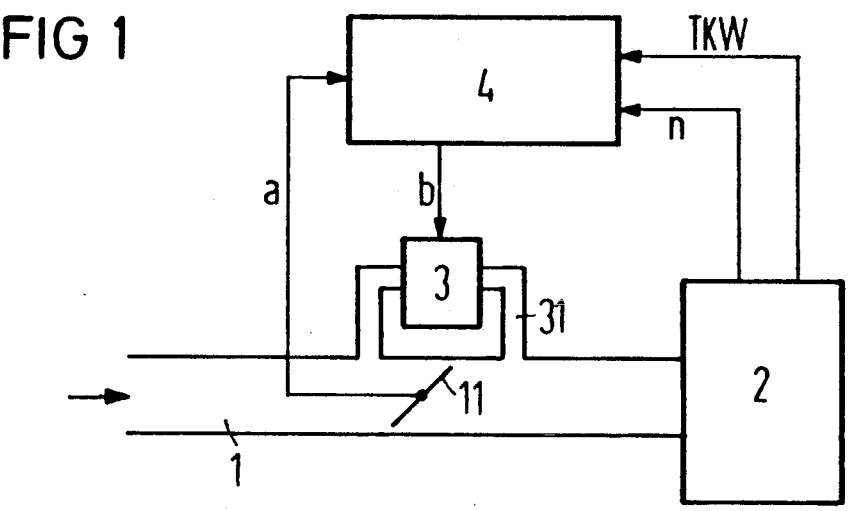

United States Patent [19]

Binnewies et al.

[11] Patent Number: 5,134,978
[45] Date of Patent: Aug. 4, 1992

[54] APPARATUS FOR CONTROLLING THE DEGREE OF OPENING OF AN IDLING FILL LEVEL REGULATOR

[75] Inventors: Ludwig Binnewies, Lappersdorf; Erwin Achleitner, Regensburg, both of Fed. Rep. of Germany

[73] Assignee: Siemens Aktiengesellschaft, Munich, Fed. Rep. of Germany

[21] Appl. No.: 709,646

[22] Filed: Jun. 3, 1991

[30] Foreign Application Priority Data

Jun. 1, 1990 [EP] European Pat. Off. ............ 90110486

[51] Int. Cl.⁵ .............................................. F02D 41/16
[52] U.S. Cl. ..................................... 123/339; 123/585
[58] Field of Search ............... 123/327, 339, 585, 587, 123/588

[56] References Cited

U.S. PATENT DOCUMENTS

| | | | |
|---|---|---|---|
| 4,237,838 | 12/1980 | Kinugawa et al. | 123/327 |
| 4,373,501 | 2/1983 | Rado | 123/589 |
| 4,438,744 | 3/1984 | Hasegawa | 123/327 |
| 4,700,679 | 10/1987 | Otobe et al. | 123/327 |
| 4,760,824 | 8/1988 | Sakurai | 123/339 |
| 4,840,156 | 6/1989 | Yamato et al. | 123/339 |
| 5,043,899 | 8/1991 | Okada et al. | 123/585 X |

FOREIGN PATENT DOCUMENTS

| | | |
|---|---|---|
| 0072578 | 2/1983 | European Pat. Off. . |
| 0153012 | 8/1985 | European Pat. Off. . |
| 3048626 | 11/1988 | Fed. Rep. of Germany . |
| 1-211641 | 8/1989 | Japan ................................. 123/585 |
| 2052796 | 1/1981 | United Kingdom . |
| 2117936 | 10/1983 | United Kingdom . |
| 2166890 | 5/1986 | United Kingdom . |

*Primary Examiner*—Willis R. Wolfe
*Attorney, Agent, or Firm*—Herbert L. Lerner; Laurence A. Greenberg

[57] ABSTRACT

A vehicle has an internal combustion engine, and a throttle flap and an idling fill level regulator communicating with the internal combustion engine. An apparatus for controlling an opening degree of the idling fill level regulator includes a regulating apparatus for regulating the opening degree of the idling fill level regulator under certain operating conditions, and a control apparatus for controlling the opening degree of the idling fill level regulator over an entire operating range in accordance with memorized control values as a function an opening degree of the throttle flap and a motor speed. The regulating apparatus supplies control signals in an idling motor speed governing range, being superimposed on control values of the control apparatus.

5 Claims, 1 Drawing Sheet

APPARATUS FOR CONTROLLING THE DEGREE OF OPENING OF AN IDLING FILL LEVEL REGULATOR

The invention relates to an apparatus for controlling the degree of opening of an idling fill level regulator of an internal combustion engine, having a regulating system that regulates the opening degree of the idling fill level regulator under certain operating conditions.

Such a closed and open-loop control apparatus is known, for instance, from German Patent DE 30 48 626. The idling rpm or motor speed of an internal combustion engine is regulated in that device through an idling fill level regulator in a bypass of an air intake tube. If the motor speed leaves the idling motor speed governing range, the idling fill level regulator maintains its last degree of opening set by the idling motor speed governing system. Each time overrunning occurs, a minimum fill level value is then established through the idling fill level regulator, as a function of the engine temperature and motor speed. The terminal position of the degree of opening of the idling fill level regulator which is then attained is maintained in each case. Such a procedure is intended to achieve favorable exhaust emissions and to prevent the engine from dying.

It is accordingly an object of the invention to provide an apparatus for controlling the degree of opening of an idling fill level regulator, which overcomes the hereinaforementioned disadvantages of the heretofore-known devices of this general type and which does so in such a way that the idling fill level regulator can assume other functions as well in a simple manner.

With the foregoing and other objects in view there is provided, in accordance with the invention, in a vehicle having an internal combustion engine, and a throttle flap and an idling fill level regulator communicating with the internal combustion engine, an apparatus for controlling an opening degree of the idling fill level regulator, comprising a regulating apparatus or system for regulating the opening degree of the idling fill level regulator under certain operating conditions, and a control apparatus for controlling the opening degree of the idling fill level regulator over an entire operating range in accordance with memorized control values as a function an opening degree of the throttle flap and a motor speed, said regulating apparatus supplying control signals in an idling motor speed governing or control range, being superimposed on control values of said control apparatus.

In accordance with another feature of the invention, there are provided means for selecting the control values for varying an effect of the throttle flap adjustment outside an idling motor speed governing range.

In accordance with a further feature of the invention, the control values effect a decrease in the opening degree of the idling fill level regulator if the throttle flap opening increases.

In accordance with an added feature of the invention, the control values effect an increase in the opening degree of the idling fill level regulator if the throttle flap opening decreases.

In accordance with a concomitant feature of the invention, during overrunning with the throttle flap closed and the motor speed above the idling motor speed, the control values provide a motor speed-dependent minimum air quantity through the opening degree of the idling fill level regulator, upon overrunning cutoff of the fuel in order to assure a combustible mixture by means of a negative pressure limitation effected thereby.

According to the invention, the idling fill level regulator is controlled over the entire engine operating range. In the idling motor speed governing range, the control is subordinate to an additional idling motor speed governing system. This idling motor speed governing system therefore only needs to compensate for incorrect adaptations in control, which only requires minor control interventions.

According to the invention, the control values for the control are stored in memory as a function of the throttle flap opening and of the engine motor speed. The most varied opening states can in fact be read out from the motor speed and the throttle flap opening, thereby permitting optimal adaptation of the degree of opening of the idling fill level regulator.

Moreover, additional functions can be controlled through the idling fill level regulator, without requiring additional calculations or even closed-loop control actions.

Accordingly, the effect of throttle flap adjustment can, for instance, be varied. For instance, it is known that during acceleration from the lower partial-load range, unpleasant jerking occurs if there is a linear throttle flap progression. However, this can easily be avoided if upon acceleration the idling fill level regulator counteracts the opening of the throttle flap to a certain extent. As a result, any arbitrary progression of the throttle flap motion can be set. In the prior art, additional calculations would be necessary to do this. Such calculations take the speed of variation of the throttle flap into account. With the present invention, a finer gradation of the load at low motor speed is thus possible.

However, with the present control, this kind of arbitrary progression can be stored in memory at the outset. Since the acceleration process begins at a certain motor speed, and the motor speed cannot change abruptly, the control values provided for the progression of the various throttle positions can be directly stored in memory for this motor speed.

A similar procedure is employed for the so-called dashpot. If, beginning at a certain opening, the throttle flap opening is abruptly decreased, a slower reduction in torque is attained this time by opening the idling fill level regulator, and thus jerking is avoided. This function, just as with the throttle flap progression, can be performed without any further calculation.

A so-called catalyst protection characteristic curve, which is intended to assure a minimum air quantity during overrunning, can likewise be stored in memory directly through the dependency between the motor speed and throttle flap opening.

Other features which are considered as characteristic for the invention are set forth in the appended claims.

Although the invention is illustrated and described herein as embodied in an apparatus for controlling the degree of opening of an idling fill level regulator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
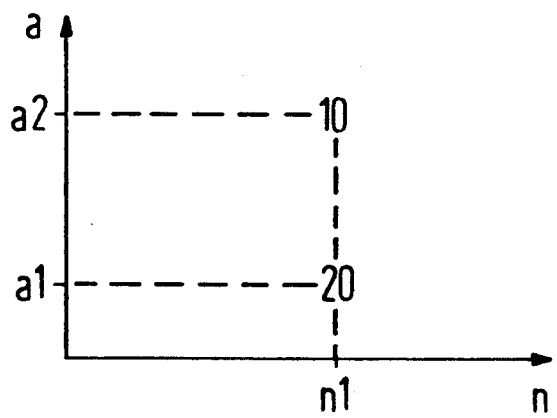

FIG. 1 is a diagrammatic view of portions of a vehicle with a schematic and block circuit diagram of an apparatus for controlling the degree of opening of an idling fill level regulator; and FIG. 2 is a throttle flap opening and rpm or motor speed performance graph which is used to explain memorized control values.

Referring now to the figures of the drawing in detail and first, particularly, to FIG. 1 thereof, there is seen an intake tube 1 of an internal combustion engine. An aspirated air mass flows through the tube 1 in the direction of the arrow and reaches an engine 2. A throttle flap 11 that is controlled by the driver serves to control this flow quantity.

A bypass 31 for the intake tube 1 bypasses the throttle flap 11 and has an opening cross section which is adjusted by means of an idling fill level regulator 3.

A microcomputer 4 with appropriate input and output interfaces serves as an open and closed-loop control apparatus for the idling fill level regulator 3. For this purpose, the microcomputer 4 receives information regarding an opening degree a of the throttle flap 11, a motor speed or rpm n and a coolant temperature TKW, as input variables. The microcomputer 4 controls the opening degree b of the idling fill level regulator 3 through its output interface.

Corresponding control values for triggering the idling fill level regulator 3 are stored in a performance graph in the microcomputer 4. This performance graph contains the control values of FIG. 2 as a function of the opening degree a of the throttle flap 11 and of the rpm or motor speed n. They are ascertained individually for each engine type on an engine test bench and in a test vehicle.

Below a certain rpm or motor speed threshold and with the throttle flap 11 closed, the control values are selected in such a way that a certain idling rpm or motor speed nl results. Additionally, a correction variable dependent on the coolant temperature and on the operating state (the gear selected, climate control system, and so forth) is added, in order to obtain the best possible pilot control. In this range, idling rpm or motor speed governing is additionally superimposed on the control. This function of governing the idling rpm or motor speed is assumed by the microcomputer 4. The detected rpm or motor speed n serves as an actual value, and the set opening degree b of the idling fill level regulator 3 serves as a control variable. The set-point value of the idling rpm or motor speed nl is stored in a further performance graph of the microcomputer 4 as a function of the coolant temperature TKW.

If the rpm or motor speed leaves the idling rpm or motor speed governing range as a result of opening of throttle flap 11, the superimposed idling rpm or motor speed governing is switched off, and the idling fill level regulator 3 is controlled solely through the performance graph as in FIG. 2.

Three performance graph functions should be distinguished from one another, in particular:

In jerky acceleration resulting from opening the throttle flap 11, the performance graph is adapted in such a way that the idling fill level regulator 3 is moved in the closing direction. The increase in the effective flow cross section for the air flow effected by the opening of the throttle flap 11 is accordingly partly compensated for by reducing the opening cross section of the bypass 31. In this operating state, the idling fill level regulator 3 accordingly acts counter to the action of the throttle flap 11. The throttle flap progression is thus attenuated. As a result, the otherwise typical jerk upon acceleration can be avoided, particularly in the lower partial-load range.

An example of this variation of the throttle flap progression is plotted in FIG. 2. It is assumed in this case that at a certain rpm or motor speed nl, the throttle flap 11 is opened from an opening degree al to an opening degree a2. At the opening degree al of the throttle flap 11, the control value for the idling fill level regulator 3 corresponds to a 20% opening. The rpm or motor speed nl has not yet been able to change as a result of the rapid opening of the throttle flap 11, but the opening degree b of the idling fill level regulator 3 is reduced to 10% in accordance with the new opening degree a2 of the throttle flap 11. Any arbitrary throttle flap progression can thus be set through a suitable selection of the control values.

When the procedure is the reverse, in other words when a jerky release of the gas pedal takes place, the performance graph acts correspondingly in the opposite direction. The abruptly reduced flow of air resulting from the jerky closure of the throttle flap 11 is attenuated through a corresponding opening of the idling fill level regulator 3. The speed at which the optimal opening of the idling fill level regulator is triggered during overrunning, can be varied through the use of a corresponding limitation in variation for the opening degree.

During overrunning, the throttle flap 11 is completely closed, and the rpm or motor speed n is above the idling rpm or motor speed nl. Due to the pronounced negative pressure resulting from the closed throttle flap 11, a combustible mixture cannot be produced, so that in an extreme case a catalytic converter connected downstream can be destroyed by overheating. For this reason, the control values for this operating situation are selected in such a way that a minimum air quantity is maintained through the idling fill level regulator 3, which assures a combustible mixture.

Any arbitrary further function of the idling fill level regulator 3 can be realized in the same performance graph or in further performance graphs.

In the event of a failure, such as a blockage, of the throttle flap 11, its function can be replaced to a limited extent by the idling fill level regulator 3. In that case the idling fill level regulator 3 is triggered like a throttle flap, through a special emergency performance graph. The position of the accelerator pedal must be used as the throttle flap value for this purpose.

We claim:

1. In a vehicle having an internal combustion engine, and a throttle flap and an idling fill level regulator communicating with the internal combustion engine, an apparatus for controlling an opening degree of the idling fill level regulator, comprising
   microcomputer means defining a regulating apparatus and a control apparatus,
   said regulating apparatus regulating the opening degree of the idling fill level regulator under certain operating conditions,
   said control apparatus controlling the opening degree of the idling fill level regulator over an entire operating range in accordance with memorized control values as a function of an opening degree of the throttle flap and a motor speed, and said regulating apparatus supplying control signals in an idling motor speed governing range, being superimposed on control values of said control apparatus.

2. The closed and open-loop control apparatus according to claim 1, including means for selecting the control values for varying an effect of the throttle flap adjustment outside an idling motor speed governing range.

3. The closed and open-loop control apparatus according to claim 2, wherein the control values effect a decrease in the opening degree of the idling fill level regulator if the throttle flap opening increases.

4. The closed and open-loop control apparatus according to claim 2, wherein the control values effect an increase in the opening degree of the idling fill level regulator if the throttle flap opening decreases.

5. The closed and open-loop control apparatus according to claim 1, wherein during overrunning with the throttle flap closed and the motor speed above the idling motor speed, the control values provide a motor speed-dependent minimum air quantity through the opening degree of the idling fill level regulator, upon overrunning cutoff of the fuel in order to assure a combustible mixture by means of a negative pressure limitation effected thereby.

* * * * *